United States Patent
Bacon

(10) Patent No.: US 10,873,773 B2
(45) Date of Patent: Dec. 22, 2020

(54) COUNTERMEASURE FOR CRYPTOGRAPHIC CRIBS

(71) Applicant: Cox Communications, Inc., Atlanta, GA (US)

(72) Inventor: Kinney C. Bacon, Lawrenceville, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 201 days.

(21) Appl. No.: 16/039,749

(22) Filed: Jul. 19, 2018

(65) Prior Publication Data

US 2020/0029105 A1    Jan. 23, 2020

(51) Int. Cl.
*H04N 21/2347* (2011.01)
*H04L 29/06* (2006.01)
*H04L 9/06* (2006.01)
*H04L 9/14* (2006.01)

(52) U.S. Cl.
CPC ....... *H04N 21/2347* (2013.01); *H04L 9/0631* (2013.01); *H04L 9/14* (2013.01); *H04L 63/0428* (2013.01)

(58) Field of Classification Search
CPC ..... H04N 21/2347; H04L 9/0631; H04L 9/14; H04L 63/0428
USPC ........................................................ 380/210
See application file for complete search history.

(56) References Cited

U.S. PATENT DOCUMENTS

| | | | | |
|---|---|---|---|---|
| 8,472,627 | B2* | 6/2013 | Denning | H04L 63/0428 380/258 |
| 9,544,133 | B2* | 1/2017 | Mathew | H04L 9/0631 |
| 10,187,200 | B1* | 1/2019 | Firestone | H04L 9/0869 |
| 2010/0077205 | A1* | 3/2010 | Ekstrom | H04L 63/0428 713/153 |
| 2010/0211787 | A1* | 8/2010 | Bukshpun | H04L 9/065 713/170 |
| 2017/0250796 | A1* | 8/2017 | Samid | H04L 9/0838 |

\* cited by examiner

*Primary Examiner* — Khalil Naghdali
(74) *Attorney, Agent, or Firm* — Eversheds Sutherland (US) LLP

(57) ABSTRACT

Systems, methods and computer readable media for providing users with encrypted content data associated with a service are disclosed. A device may receive first content data. The device may encrypt the first content data using a first key to obtain first encrypted data. The device may generate second encrypted data by applying a cipher substitution to the first encrypted data using a second key. The device may cause to send the second encrypted data to a second device.

18 Claims, 7 Drawing Sheets

COUNTERMEASURE FOR CRYPTOGRAPHIC CRIBS

BACKGROUND

A variety of types of services exist for providing users with a service, including video services, data services, voice services, security services, and the like. A provider of network-based services may want to encrypt information that is sent to a receiver in the course of the provision of the network-based services. Third parties may attempt to break the encryption of information provided by a service provider to a customer (e.g., to gain unauthorized access to the provided service). Content that has only been encrypted is still susceptible to brute force key attacks, which can lead to unauthorized access to information provided in connection with a network-based service.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
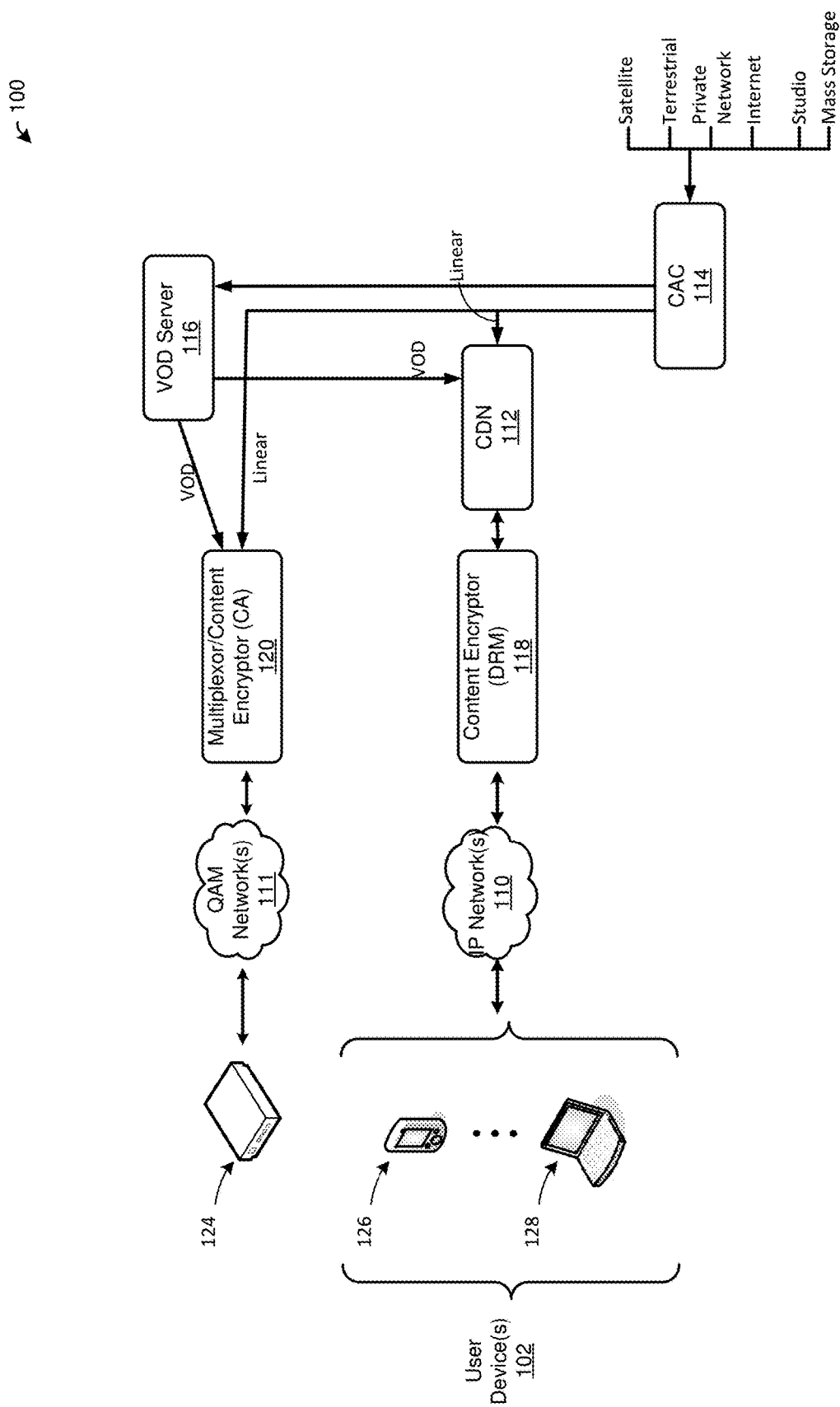
FIG. 1 is a schematic diagram of an illustrative architecture for providing network-based services to customers via one or more networks, in accordance with one or more example embodiments of the disclosure.

This disclosure relates to, among other things, a network-based services system and associated methods and computer-readable media for implementing and managing such a system to provide network-based services to customers.

A provider of network-based services may want to encrypt information that is sent to a receiver in the course of the provision of the network-based services. For example, a service provider may provide one or more of video services, data services, voice services, home security services, billing services, application services, web services, and the like. Information that is sent to a receiver (e.g., a customer of a service provider) may be encrypted in order to ensure that only authorized users are allowed access to the provided service.

Third parties may attempt to break the encryption of information provided by a service provider to a customer (e.g., to gain unauthorized access to the provided service). One of the methods used to break encrypted data is to look for specific known patterns, commonly called "cribs." As an example, the Moving Pictures Expert Group (MPEG) transport stream format encrypts information such that a third party may be able to predict that certain values will appear in certain locations of the data packet, thereby allowing such a "crib" to be run through various known and/or guessed encryption keys until the "crib" value is detected. Other Internet Protocol (IP) packets, such as those that use Hyper-text Markup Language (HTML) or Extensible Markup Language (XML), may have the same issues (e.g., these IP packets have predictable values in certain locations). When attempting to break the encryption, these known values may be used to determine whether a given key that was used to encrypt the data is correct. This brute force vulnerability allows for the automated discovery of the cryptographic key.

The present disclosure provides for devices, systems, and methods that may be used in addition to known cryptographic methods to prevent and/or mitigate the detection of predictable values within a data stream. As such, the advantages of cryptography are retained in addition to the ability to reduce the chance that a third party would be able to find the key used by the encryption mechanism.

The present disclosure provides for devices, systems, and methods that may be used in connection with the provision of one or more services to a consumer. For example, these services may include video services, data services, voice services, home security services, billing services, application services, web services, and the like. In providing these services, a sending entity (e.g., a service provider) may send encrypted information to a receiving entity (e.g., a consumer).

An illustrative embodiment may use a cipher substitution (e.g., on a byte level and/or on a word level) in addition to any existing encryption protocol. The cipher substitution may be performed (e.g., using various procedures, such as indirect addressing, which is common to Central Processing Unit (CPU) architectures), thereby adding an extra layer of security to the encrypted data and making automated discovery of the encryption key more difficult.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

FIG. 1 is a schematic diagram of an illustrative architecture for providing network-based services to customers via one or more networks, in accordance with one or more example embodiments of the disclosure.

A consumer may be provided with a variety of services by a service provider. For example, a service provide may provide one or more of video services, data services, voice services, home security services, billing services, application services, web services, and the like. In providing these services, a sending entity (e.g., a service provider) may send encrypted information to a receiving entity (e.g., a consumer). A consumer may access content distributed in connection with the provision of services via one or more user device(s) 102. The user device(s) 120 (e.g., devices 124, 126, or 128) may include any suitable processor-driven device including, but not limited to, a mobile device or a non-mobile, e.g., a static, device. For example, the user device(s) 120 and/or the AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

A consumer may communicate with a service provider (e.g., by a content distributor) via one or more network(s) 110 (e.g., the Internet) to receive one or more services. For example, a consumer may access content via a cable access network for carrying downstream and upstream data between a head end or a cable modem termination system (CMTS) and a user device(s) 102 (e.g., a laptop, a smartphone, a television, and the like).

The system 100 may further include a content acquisition chain (CAC) 114 and a content distribution network (CDN) 112. In brief overview, content may be acquired either from satellite feeds (e.g., including receiving antenna, demodulators, etc.), terrestrial feeds (e.g., including receiving antenna, demodulator, etc.), a private network (e.g., usually a dedicated fiber feed), the Internet, a local studio, and/or a mass storage device (e.g., a hard disk drive (HDD), usually used for video on demand (VOD)). Linear data may be received as is or may be converted to a single program transport stream (SPTS) and may be encoded with MPEG-2 or MPEG-4 A/V. VOD data may be received as one or more files. The two types of content may include linear and VOD. VOD content may be received, processed, and/or stored on a VOD server 116 for playback.

For quadrature amplitude modulation (QAM) linear delivery, the linear content may be transcoded, bit rate adjusted, and/or processed by various means. Selected programs may be multiplexed together to create a multi-program transport stream (MPTS) by a multiplexor/content encryptor (CA) 120. This MPTS stream may be encrypted by the multiplexor/content encryptor (CA) 120 using conditional access encryption (e.g., Technicolor PowerKey™, Arris MediaCipher™ technologies, etc.). The output of the multiplexor/content encryptor (CA) 120 may be QAM modulated and combined to create multiple carriers, which may be carried via QAM network(s) 111 (e.g., a hybrid fiber-coaxial (HFC) plant) and delivered to the customer's home. Note that the output of the multiplexor/content encryptor (CA) 120 may be encrypted and enciphered (e.g., to prevent the use of cribs to break the encryption) according to the embodiments discussed in greater detail below. There, a set top box (STB) 124 may tune to the selected QAM carrier, demodulate the signal, demultiplex the signal to obtain an encrypted SPTS of the desired channel, decrypt the SPTS, and then feed the decrypted SPTS into an MPEG decoder to obtain audio/video (A/V) signals to transmit to a user device, such as a television (e.g., over HDMI, component, composite, or RF modulated signals). For QAM VOD delivery, the VOD files may be loaded onto the VOD server 116. When a subscriber selects the desired content, the VOD server may output the SPTS file into the multiplexor/content encryptor (CA) 120. From this point on, the SPTS file may be handled the same as linear content (e.g., delivered via QAM network(s) 111 to set top box 124). Note that one methodology encrypts the content prior to storing it on the VOD server 116 while another methodology encrypts after storing it on the VOD server 116.

For Internet protocol (IP) linear delivery, the linear output of the CAC 114 may be provided to the CDN 112. The CDN 112 may convert the linear output of the CAC 114 into multiple files, generally using the hypertext transfer protocol (HTTP) live streaming (HLS) and/or dynamic adaptive streaming over HTTP (DASH) protocols. These files may be stored for a short period of time (e.g., 5 seconds, 30 seconds, 1 minute, 30 minutes, 1 hour, and the like). The content stored on the CDN server 112 may be generated using any appropriate programming language such as, for example, HTML, XHTML, XML, dynamic programming languages (e.g., JavaScript, Perl, etc.), and so forth. Each subscriber that wishes to view the content over an IP connection may request the content using the correct protocols, and an individual transmission control protocol (TCP) connection may be established. A content encryptor (DRM) 118 may perform the needed protocols to establish a common encryption key with a STB, and the CDN 112 may then begin to stream the content over the unidirectional link to the content encryptor (DRM) 118 and then to a receiving user device 102, which may be a smartphone, laptop, STB, or other user device 102. Note that the output of the content encryptor (DRM) 118 may be encrypted and enciphered (e.g., to prevent the use of cribs to break the encryption) according to the embodiments discussed in greater detail below. Because IP is used as the transport mechanism, the physical medium may not be relevant if the desired bandwidth, latency, and jitter are within specification. For example, IP content may be delivered to the subscriber over HFC using data over cable service interface specification (DOCSIS) or over fiber using a passive optical network (PON), received in the household, converted to Wi-Fi signals, and be received and processed by the user device 102.

Figure 2:
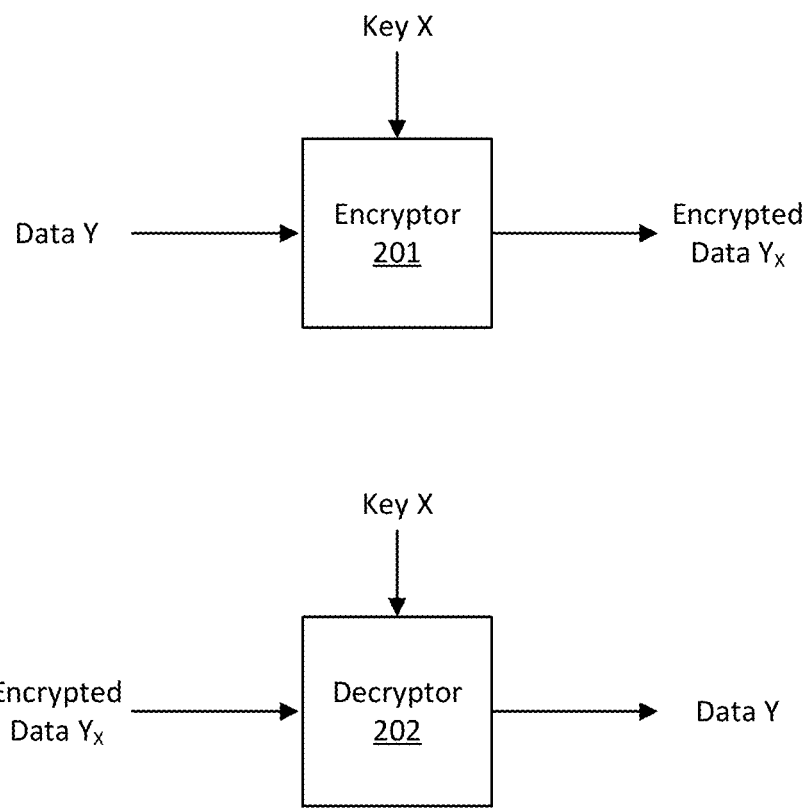
FIG. 2 is a schematic diagram illustrating an example for encryption and decryption within a network-based services system.

FIG. 2 is a schematic diagram illustrating encryption and decryption within a network-based services system.

Various types of encryption protocols may be used to encrypt data. For example, data may be encrypted using symmetric encryption or asymmetric encryption. Symmetric encryption includes the encryption of information wherein both the sender and the receiver share the same secret key (or wherein both the sender and the receiver have different keys, but the different keys are related in a known, computable way). In other words, symmetric encryption leverages that both the sender and the receiver have access to a shared secret (e.g., a key) used to encrypt the shared data. No other value other than the key will allow decryption back to the original information.

When a sender wants to send information (e.g., data) to a receiver using symmetric encryption, the sender can encrypt the information using the shared key and a symmetric key encryption algorithm. Examples of symmetric key encryption algorithms include the Data Encryption Standard (DES), the Advanced Encryption Standard (AES), and the like. After receiving encrypted data, the receiver can use the known key to decrypt the encrypted data and obtain the information sent by the sender.

Asymmetric encryption includes the encryption of information using pairs of keys, including a public key, which may be exposed to the public (e.g., disseminated widely), and a private key, which may be known only to the owner. In an asymmetric encryption scheme, when a sender wants to send information (e.g., data) to a receiver, the sender can encrypt the information using the receiver's public key. After receiving the encrypted data, the receiver can use the receiver's private key to decrypt the encrypted data and obtain the information sent by the sender. Some implementations utilize asymmetric encryption to transmit the symmetric secret key to a receiver, for example because symmetric encryption requires less computation and, hence, is faster. This implementation may be used in CATV Conditional Access (CA) and Digital Rights management (DRM), as well as other secure transport protocols.

By way of example, FIG. 2 illustrates a system 200, which uses symmetric encryption that includes using a key to encrypt data to obtain encrypted data. A system similar to the system 200 may be used in one or more components of system 100 of FIG. 1, such as the CDN servers 112, the hub/head-end 106, and/or the user device(s) 102. In one embodiment, an encryptor 201 may receive and/or determine data Y. The encryptor 201 may determine or receive a key X, and then use key X to encrypt data Y. The result of the encryption may be encrypted data $Y_X$. encrypted data $Y_X$ may be sent to a receiver of the data (e.g., to a receiver that knows and/or is able to determine key X so as to enable decryption of encrypted data $Y_X$).

In one embodiment, a decryptor 202 may receive and/or determine encrypted data $Y_X$. The decryptor 202 may receive key X (e.g., over a secure channel) and/or may determine key X (e.g., from a local or remote storage). The decryptor 202 may use key X to decrypt Encrypted data $Y_X$. The result of the decryption may be data Y (e.g., the data that was originally encrypted by encryptor 201). Using the system 200, a sender may securely transmit information (e.g., data Y) to a receiver such that only a receiver that can determine the key (e.g., key X) can decrypt the encrypted information. Note that the encryptor 201 and the decryptor 202 may be the same or different entities. In other words, a component of a system may be configured to both encrypt outgoing messages and decrypt incoming messages.

Figure 3:
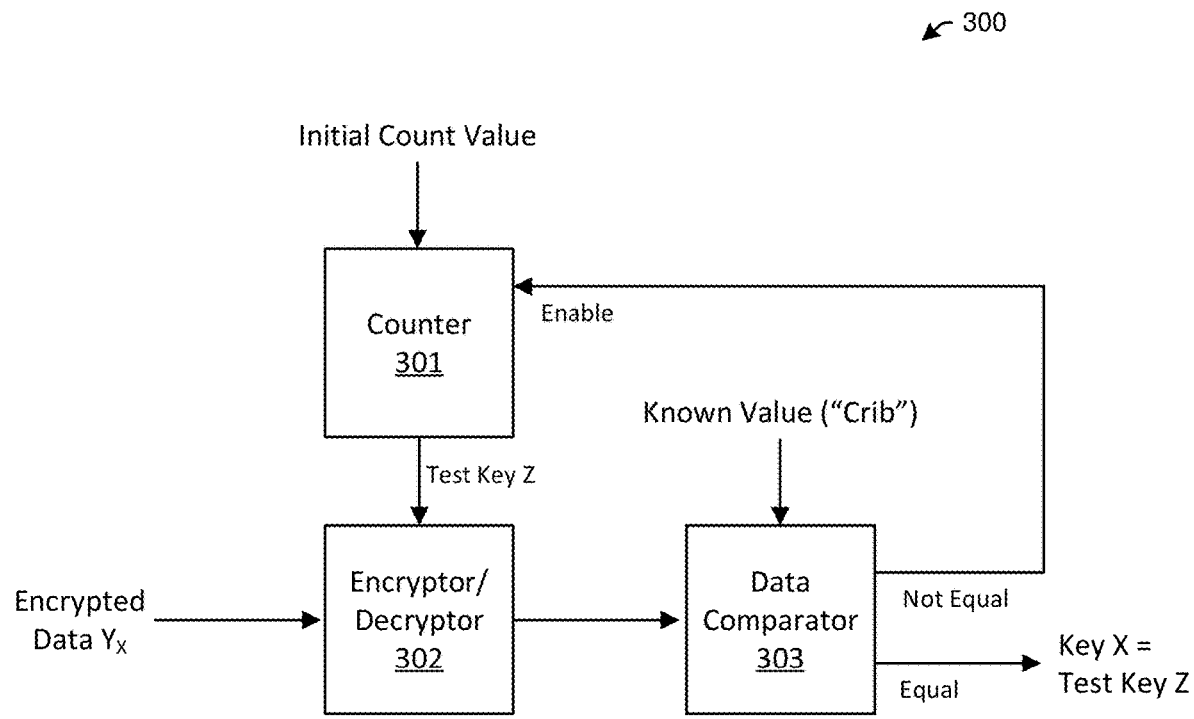
FIG. 3 is a schematic diagram illustrating a block diagram of a system for determining an encryption key using a cryptographic crib.

FIG. 3 is a schematic diagram illustrating a block diagram of a system for determining an encryption key using a cryptographic crib.

In one embodiment, a third party (e.g., neither the sender nor the receiver of a message) may attempt to obtain the transmitted information by attempting to decrypt an intercepted and/or received encrypted information. For example, a third party may attempt to exploit and/or discover the key used to encrypt the information (e.g., key X of FIG. 2). In one embodiment, a third party may attempt a brute-force attack, which includes attempting all possible password, passphrases, and/or values (e.g., in a systematic manner) until the correct value for the key is found. For example, a third party may build a circuit that is configured to run through all possible values for the key. Due at least in part to an increase in processor speeds and an ability to run parallel circuits (e.g., with different initial count values), a brute-force attack is a feasible means of breaking the encryption of an encrypted message. Furthermore, the encryption protocol may be of a well-known type, such as DES or AES, increasing the susceptibility of an encrypted message being intercepted and read by an unauthorized recipient.

For example, FIG. 3 shows a system 300, which may be used to determine an encryption key. The system 300 may be used to iterate though various possible key values, wherein during each iteration, the system 300 attempts to decrypt encrypted information with each possible key value. In one embodiment, the counter 301 may begin with an initial count value that may be used to determine an initial key, which may be a test key. For example, in an illustrated embodiment, the current count value may indicate that test key Z may be used to attempt a decryption of encrypted information. The counter 301 may send the current test key (e.g., test key Z) to the encryptor/decryptor 302. The encryptor/decryptor 302 may use the current test key to attempt to decrypt encrypted information. In an illustrated embodiment, the encryptor/decryptor 302 may attempt to decrypt encrypted data $Y_X$ (e.g., data Y that has been encrypted using (unknown) key X) using test key Z. In other words, the encryptor/decryptor 302 may attempt to decrypt data $Y_X$ to determine whether test key Z is the same as key X.

In one embodiment, the encryptor/decryptor 302 may send the result of the attempted decryption of the information (e.g., the result of the decryption of the encrypted information with the current test key) to a data comparator 303. The data comparator 303 may evaluate the result of the received decryption attempt by looking for a known value (e.g., a "crib"). In other words, the system 300 attempts to break the encryption of the encrypted information by looking for specific known patterns, commonly called "cribs." For example, the MPEG transport stream format encrypts information such that a third party may be able to predict that certain values will appear in certain locations of the data packet, thereby allowing such a "crib" to be run through various known and/or guessed encryption keys until the "crib" value is detected. Other IP packets, such as those that use HTML or XML, have the same issues (e.g., these IP packets have predictable values in certain locations). When attempting to break the encryption, these known values may be used to determine whether a given key that was used to encrypt the data is correct. This brute force vulnerability allows for the automated discovery of the cryptographic key.

In one embodiment, if the data comparator 303 determines that the "crib" is valid in the result of the attempted decryption received from the encryptor/decryptor 302 (e.g., the data comparator 303 determines that a known value at a known location in the data packet is present within the result of the attempted decryption), then the current test key (e.g., test key Z) is determined to be equal to the key used to encrypt the information (e.g., key X used to encrypt data $Y_X$). If the data comparator 303 determines that the "crib" is not valid in the result of the attempted decryption received from the encryptor/decryptor 302 (e.g., the data comparator 303 determines that the known value at the known location in the data packet is not present within the result of the attempted decryption), then the count value increases and the process begins again with a new current test key (e.g., test key Z+1). This process may be repeated (e.g., the process may be performed iteratively using every possible value as the current test key) in a systematic manner until the "crib" value is detected, indicating that the current test key is the key used to encrypt the information.

Figure 4:
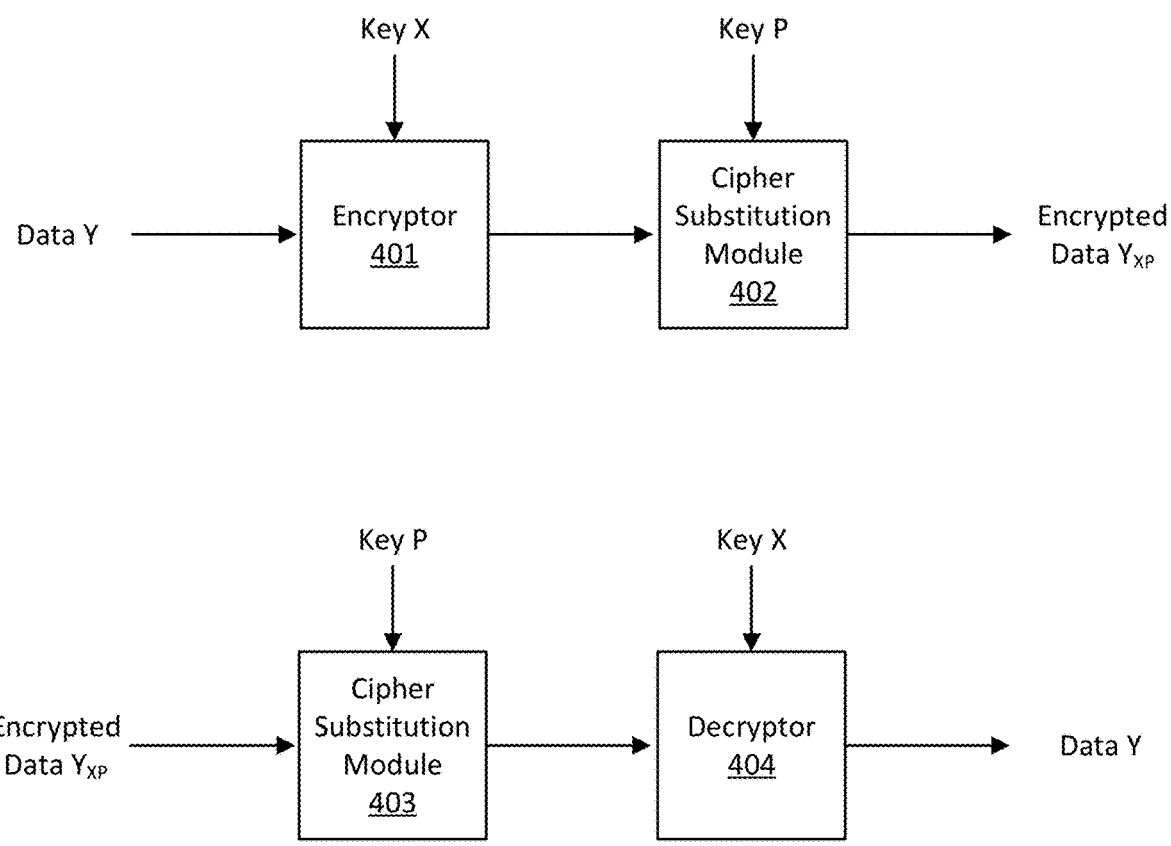
FIG. 4 is a schematic diagram illustrating encryption and decryption using a cipher substitution, in accordance with one or more example embodiments of the disclosure.

FIG. 4 is a schematic diagram illustrating encryption and decryption using a cipher substitution, in accordance with one or more example embodiments of the disclosure.

To address the above shortcomings of the prior art, an encryption/decryption system may include a cipher substitution. In one embodiment, a cipher substitution may be used in connection with encryption as a countermeasure for cryptographic cribs. For example, an encryptor 401 may receive and/or determine information to be encrypted (e.g., data Y). The encryptor 401 may determine a key (e.g., key X) to use to encrypt the information. The encryptor 401 may send the encrypted information (e.g., data Y encrypted using key X, which may be referred to as first encrypted data) to a cipher substitution module 402. The cipher substitution module 402 may determine a second key (e.g., key P) to use to determine a cipher substitution algorithm. For example, cipher substitution module 402 may receive the second key, wherein the second key is an index value. The cipher substitution module 402 may determine a particular cipher substitution algorithm using the index value. For example, the cipher substitution module 402 may access a data structure (e.g., a list, a table, or the like) that includes a plurality of possible cipher substitution algorithms and corresponding index values. The cipher substitution module 402 may use the received index value to identify a particular one of the plurality of cipher substitution algorithms. These procedures are explained in greater detail below. The cipher substitution module 402 may apply the cipher to the encrypted information (e.g., the cipher substitution module 402 may perform a cipher substitution algorithm on first encrypted data to generate second encrypted data). For example, if key P indicates that a simple cipher substitution algorithm should be used, the cipher substitution module 402 will apply the simple cipher substitution algorithm to the encrypted information. The result of application of the cipher substitution may be information that has been both encrypted (e.g., using key X) and run through a cipher substitution (e.g., using an algorithm indicated by key P) to yield encrypted data $Y_{XP}$.

The encryption performed by the encryptor 401 and the cipher substitution performed by the cipher substitution module 402 may be performed by the same entity and/or by different entities. In other words, a component of a system may be configured to both encrypt the information and perform a cipher substitution on the information. Note that the encryption performed by the encryptor 401 and the cipher substitution performed by the cipher substitution module 402 may be performed in any order. In other words, data Y may be encrypted first by the encryptor 401 and then a cipher substitution may be performed on the encrypted data Y second by the cipher substitution module 402. Similarly, a cipher substitution may be performed on data Y first by the cipher substitution module 402 and then the result of the cipher substitution may be encrypted second by the encryptor 401. In both scenarios, performance of the encryption and the cipher substitution may result in encrypted data $Y_{XP}$.

In one embodiment, the cipher substitution algorithm may be determined from one or more cipher substitution algorithms (e.g., from a list and/or a table of potential cipher substitution algorithms). For example, there are several types of cipher substitution algorithms, including a simple fixed substitution, a dynamically changing cipher substitution, and the like. A simple substitution cipher may include, for example, the substitution of single letters separately. For example, a simple substitution cipher may use ciphertext to encipher information. Ciphertext is the result of performing an algorithm on plaintext. For example, the algorithm may indicate that plaintext should be shifted by a certain number of letters to arrive at the ciphertext used to perform the simple substitution cipher (e.g., an alphabet should be shifted by 1, 2, 3, or any number of letters, to arrive at the ciphertext). Other types of cipher substitutions include, but are not limited to, homophonic substitution, polyalphabetic substitution, polygraphic substitution, block ciphers, and the like. Note that numerous cipher substitutions are known to skilled artisans.

In one embodiment, the encrypted data $Y_{XP}$ may be sent to a receiver (e.g., an intended recipient of data Y). A cipher substitution module 403 of the receiver may determine a first key (e.g., key P) to use to determine the cipher substitution algorithm that was used by the cipher substitution module 402 of the sender. For example, the first key may be received from the sender, either in connection with encrypted data $Y_{XP}$ or separately from encrypted data $Y_{XP}$. The first key may then be used to determine the appropriate cipher substitution algorithm. For example, the first key may be an index value that points to a specific cipher substitution algorithm in a data structure that is known to both the sender and the receiver.

In one embodiment, the cipher substitution module 403 may perform the cipher substitution algorithm on the encrypted information. For example, if the cipher substitution module 403 determines that the key corresponds to a simple fixed cipher substitution algorithm, the cipher substitution module 403 will execute the simple fixed cipher substitution algorithm on the encrypted data $Y_{XP}$. The data that results from execution of the cipher substitution algorithm (e.g., encrypted data $Y_X$) may be sent by the cipher substitution module 403 to a decryptor 404.

In one embodiment, the decryptor 404 may determine a second key (e.g., key X) that was used by the encryptor 401 of the sender to encrypt the information. For example, decryptor 404 may determine key X using one or more key exchange methods known in the field, such as a Diffie-Hellman key exchange. The decryptor 404 may decrypt encrypted data $Y_X$ to obtain the information send by the sender (e.g., data Y). Note that the cipher substitution performed by the cipher substitution module 403 and the decryption performed by the decryptor 404 may be performed by the same entity and/or by different entities. In other words, a component of a system (e.g., system 100 of FIG. 1) may be configured to both decrypt the information and perform a cipher substitution on the information. Note that the cipher substitution performed by the cipher substitution module 403 and the decryption performed by the decryptor 404 may be performed in any order. In other words, a cipher substitution may be performed on data Y first by the cipher substitution module 403 and then the result of the cipher substitution may be decrypted second by the decryptor 404. Similarly, encrypted data $Y_{XP}$ may be decrypted first by the decryptor 404 to produce data $Y_P$ and then a cipher substitution may be performed second by the cipher substitution module 403. In both scenarios, performance of the encryption and the cipher substitution may result in data Y.

In one embodiment, the receiver of encrypted data $Y_{XP}$ may determine key P that was used by the sender based at least in part on an indication received from the sender. For example, the sender may send an indication separate from the sending of encrypted data $Y_{XP}$ and/or appended to encrypted data $Y_{XP}$, wherein the indication is indicative of key P. In one embodiment, the receiver may determine key P based on an algorithm that does not depend on an indication received from the sender. For example, the determination of key P may be based on one or more of a time the message was sent, a time the message was received, a counter value, or the like. In other words, the sender and the receiver may use a common method of determining the cipher substitution key, key P.

Illustrative Device Architecture

Figure 5:
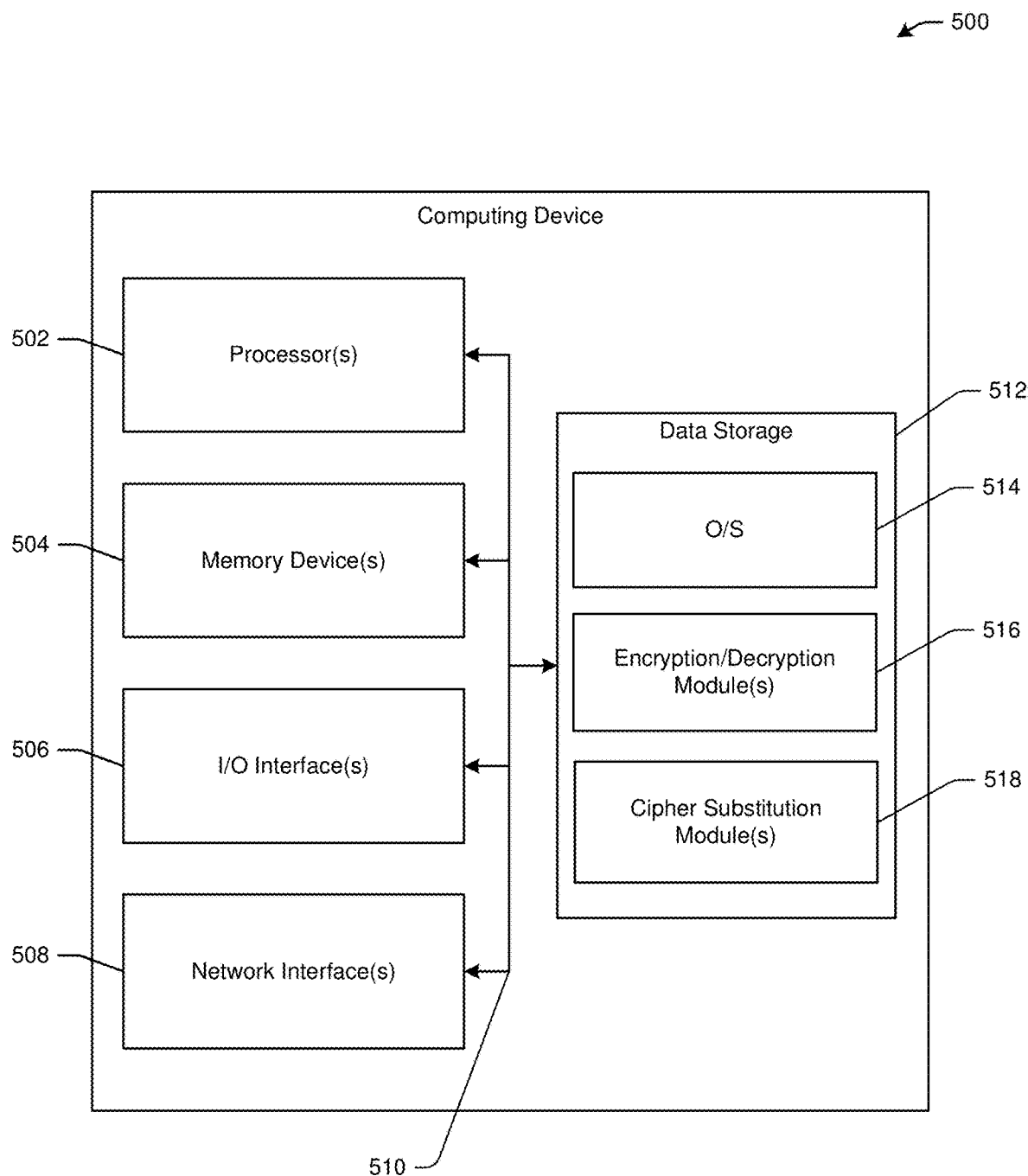
FIG. 5 is a schematic block diagram of an example computing device of a network-based services system, in accordance with one or more example embodiments of the disclosure.

FIG. 5 is a schematic block diagram of an example computing device of a network-based services system, in accordance with one or more example embodiments of the disclosure. In one embodiment, the device 500 may be one or more of CDN 112, user devices 102, and/or hub/head-end 106 of FIG. 1. In an illustrative configuration, the device 500 may include one or more processors (processor(s)) 502, one or more memory devices 504 (generically referred to herein as memory 504), one or more input/output ("I/O") interface(s) 506, one or more network interfaces 508, and data storage 512. The device 500 may further include one or more buses 510 that may functionally couple various components of the device 500. These various components will be described in more detail hereinafter.

The bus(es) 510 may include at least one of a system bus, a memory bus, an address bus, or a message bus, and may permit exchange of information (e.g., data (including computer-executable code), signaling, etc.) between various components of the device 500. The bus(es) 510 may have any of a variety of bus structures including, without limitation, a memory bus or a memory controller, a peripheral bus, an accelerated graphics port, and so forth. The bus(es) 510 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, a Serial Peripheral Interface architecture, and so forth.

The memory 504 of the device 500 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 504 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 504 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 512 may include removable storage and/or non-removable storage including, but not limited to, magnetic storage, optical disk storage, and/or tape storage. The data storage 512 may include, for example, memory cards, USB flash drives, external hard disk drives, optical discs, and so forth. The data storage 512 may provide non-volatile storage of computer-executable instructions and other data. The memory 504 and the data storage 512, removable and/or non-removable, are examples of computer-readable storage media (CRSM) as that term is used herein.

The data storage 512 may store computer-executable code, instructions, or the like that may be loadable into the memory 504 and executable by the processor(s) 502 to cause various operations to be performed. In certain example embodiments, computer-executable code stored in the data storage 512 may be executable by the processor(s) 502 directly from the data storage 502. The data storage 512 may additionally store data that may be copied to memory 504 for use by the processor(s) 502 during the execution of the computer-executable instructions. Moreover, output data generated as a result of execution of the computer-executable instructions by the processor(s) 502 may be stored initially in memory 504, and may ultimately be copied to data storage 512 for non-volatile storage.

More specifically, the data storage 512 may store one or more operating systems (O/S) 514; one or more encryption/decryption module(s) 516; and one or more cipher substitution module(s) 518. Any of the modules depicted in FIG. 5 may include computer-executable code, instructions, or the like that may be loaded into the memory 504 for execution by one or more of the processor(s) 502.

The processor(s) 502 may be configured to access the memory 504 and execute computer-executable instructions loaded therein. For example, the processor(s) 502 may be configured to execute computer-executable instructions of the various program modules of the device 500 to cause or facilitate various operations to be performed in accordance with one or more embodiments of the disclosure. The processor(s) 502 may include any suitable processing unit capable of accepting data as input, processing the input data in accordance with stored computer-executable instructions, and generating output data. The processor(s) 502 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 502 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 502 may be capable of supporting any of a variety of instruction sets.

Referring now to functionality that may be supported by the various program modules depicted as being stored in the data storage 512, the encryption/decryption module(s) 516 and/or the cipher substitution module(s) 518 may include computer-executable code, instructions, or the like for performing encryption and/or decryption in connection with a cipher substitution on information, including on information sent between a sender and a receiver. Additionally, or alternatively, the encryption/decryption module(s) 516 may include computer-executable code, instructions, or the like for encrypting an outgoing message and/or decrypting an incoming message. In one embodiment, the encryption/decryption module(s) 516 may perform one or more of the functions performed by encryptor 401 and/or decryptor 404 of FIG. 4. The cipher substitution module(s) 518 may additionally, or alternatively, include computer-executable code, instructions, or the like for determining a cipher substitution key and/or performing a cipher substitution on information (e.g., on information that may or may not be encrypted). In one embodiment, the cipher substitution module(s) 518 may perform one or more of the functions performed by cipher substitution module 402 and/or cipher substitution module 403 of FIG. 4.

Referring now to other illustrative components depicted in FIG. 5 as being stored in the data storage 512, the O/S 514 may be loaded from the data storage 512 into the memory 504 and may provide an interface between other application software executing on the device 500 and hardware resources of the device 500. More specifically, the O/S 514 may include a set of computer-executable instructions for managing hardware resources of the device 500 and for providing common services to other application programs (e.g., managing memory allocation among various application programs). The O/S 514 may include any operating system now known or which may be developed in the future including, but not limited to, any proprietary or non-proprietary operating system (e.g., a Linux based operating system).

Referring now to other illustrative components of the device 500, one or more input/output (I/O) interfaces 506 may be provided that may facilitate the receipt of input information by the device 500 from one or more I/O devices as well as the output of information from the device 500 to the one or more I/O devices. The I/O devices may include, for example, one or more user interface devices that facilitate interaction between a user and the device 500 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth. The device 500 may further include one or more network interfaces 508 via which the device 500 may communicate with any of a variety of other systems, platforms, networks, devices, and so forth. The input/output interface(s) 506 and/or the network interface(s) 508 may include or otherwise facilitate communication via any of a variety of types of serial or parallel ports including, without limitation, an Ethernet port, a USB port, a High-Definition Multimedia Interface (HDMI) port, a Video Graphics Array (VGA) port, a coaxial RF connector (female), and so forth.

The network interface(s) 508 may facilitate communication between the device 500 and one or more other devices via any suitable type of network. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

It should be appreciated that the program modules, applications, computer-executable instructions, code, or the like depicted in FIG. 5 as being stored in the data storage 512 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the device 500, and/or hosted on other computing device(s) accessible via one or more networks, may be provided to support functionality provided by the program modules, applications, or computer-executable code depicted in FIG. 5 and/or additional or alternate functionality. Further, functionality may be modularized differently such that processing described as being supported collectively by the collection of program modules depicted in FIG. 5 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 5 may be implemented, at least partially, in hardware and/or firmware across any number of devices.

It should further be appreciated that the device 500 may include alternate and/or additional hardware, software, or firmware components beyond those described or depicted without departing from the scope of the disclosure. More particularly, it should be appreciated that software, firmware, or hardware components depicted as forming part of the device 500 are merely illustrative and that some components may not be present or additional components may be provided in various embodiments. While various illustrative program modules have been depicted and described as software modules stored in data storage, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Illustrative Process

Figure 6:
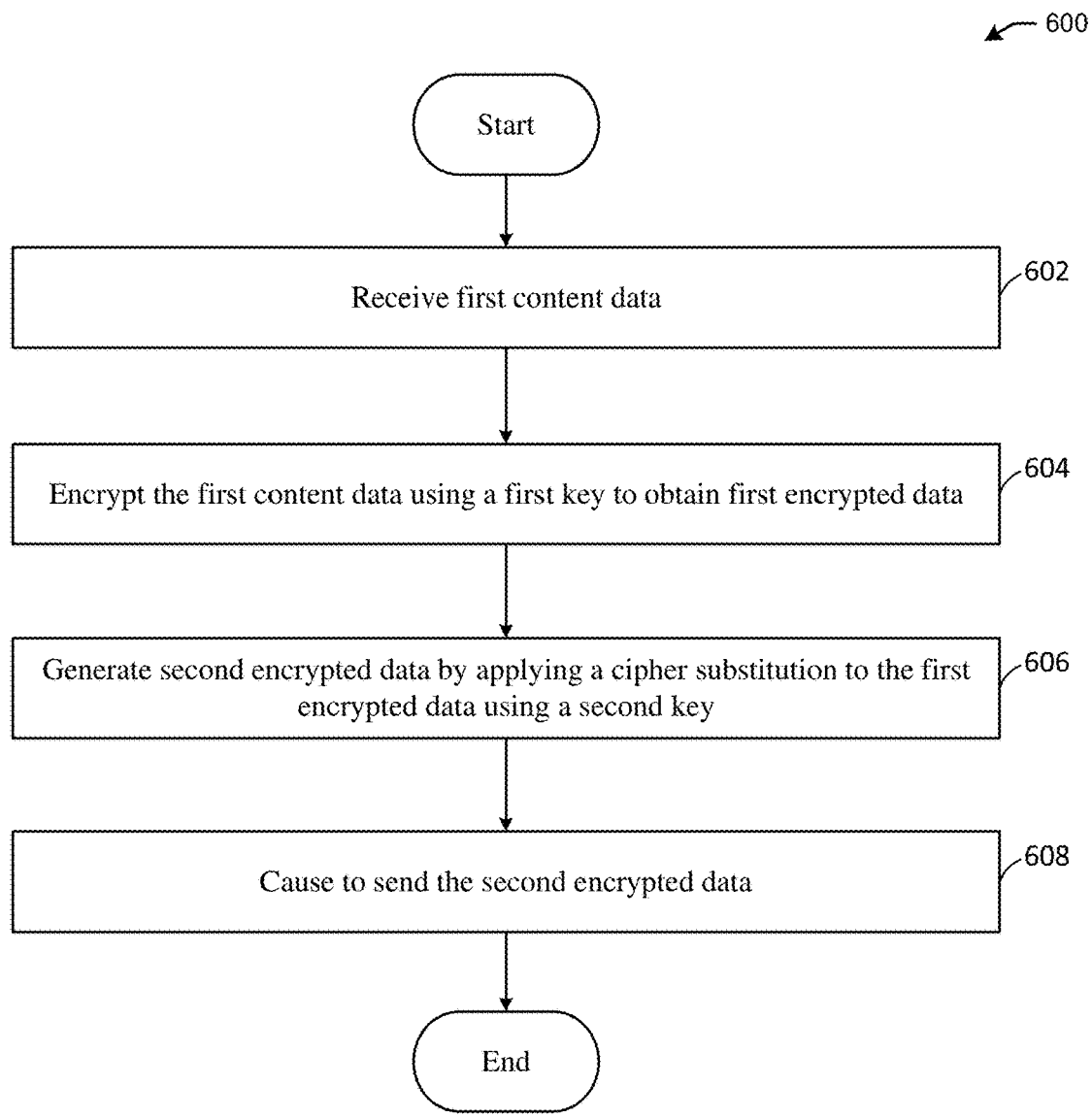
FIG. 6 is a process flow diagram of an illustrative method for encrypting data, in accordance with one or more example embodiments of the disclosure.

FIG. 6 is a process flow diagram of an illustrative method for encrypting data, in accordance with one or more example embodiments of the disclosure.

At block 602, a first device (e.g., a sender, such as content distribution network server(s) 112 of FIG. 1) may receive first content data. The first content data may include data associated with the provision of one or more services, including one or more of video services, data services, voice services, home security services, billing services, application services, or web services.

At block 604, the first device may encrypt the first content data using a first key to obtain first encrypted data. The first key may be one of a secret key or a public-private key. The first data may be encrypted according to transport layer security (TLS) or secure socket layer (SSL).

At block 606, the first device may generate second encrypted data by applying a cipher substitution to the first encrypted data using a second key. Generating the second encrypted data may comprise determining a first cipher algorithm from a plurality of cipher algorithms based on an index value; and determining the second key based on the first cipher algorithm. The first device may cause to send the index value to the second device. For example, an index value may be hard coded in the firmware, may be in a configuration file, may be transmitted by some separate means (e.g., such as within the MPEG System Information data), may be transmitted as a DHCP option value, and/or may be transmitted with the encrypted data (e.g., via the same and/or via a different mechanism). It should be assumed that the index value would be transmitted using a secure method. The cipher substitution may include one or more of: a simple cipher substitution, a dynamically changing cipher substitution, a polyalphabetic substitution, and/or a polygraphic substitution. The first device may cause to send a value indicative of the second key to the device.

At block 608, the first device may cause to send the second encrypted data. The first device may receive second content data; encrypt the second content data using the first key to obtain third encrypted data; generate fourth encrypted data by applying a second cipher substitution to the third encrypted data using a third key, wherein the second cipher substitution is different from the first cipher substitution; and cause to send the fourth encrypted data to the second device.

One or more operations of method 600 may have been described as being performed by one or more components of a system, such as system 100 of FIG. 1, or more specifically, by one or more program modules executing on such components. It should be appreciated, however, that any of the operations of method 600 described as being performed by a particular component or a particular program module executing thereon may be performed by another component or another program module executing thereon. In addition, it should be appreciated that processing performed in response to execution of computer-executable instructions provided as part of an application, program module, or the like may be described herein as being performed by the application or the program module itself, by a device on which the application, program module, or the like is executing, or by a system that includes such a device. While the operations of method 600 are described in the context of the illustrative system 100, it should be appreciated that the method may be implemented in connection with numerous other architectural and device level configurations.

Figure 7:
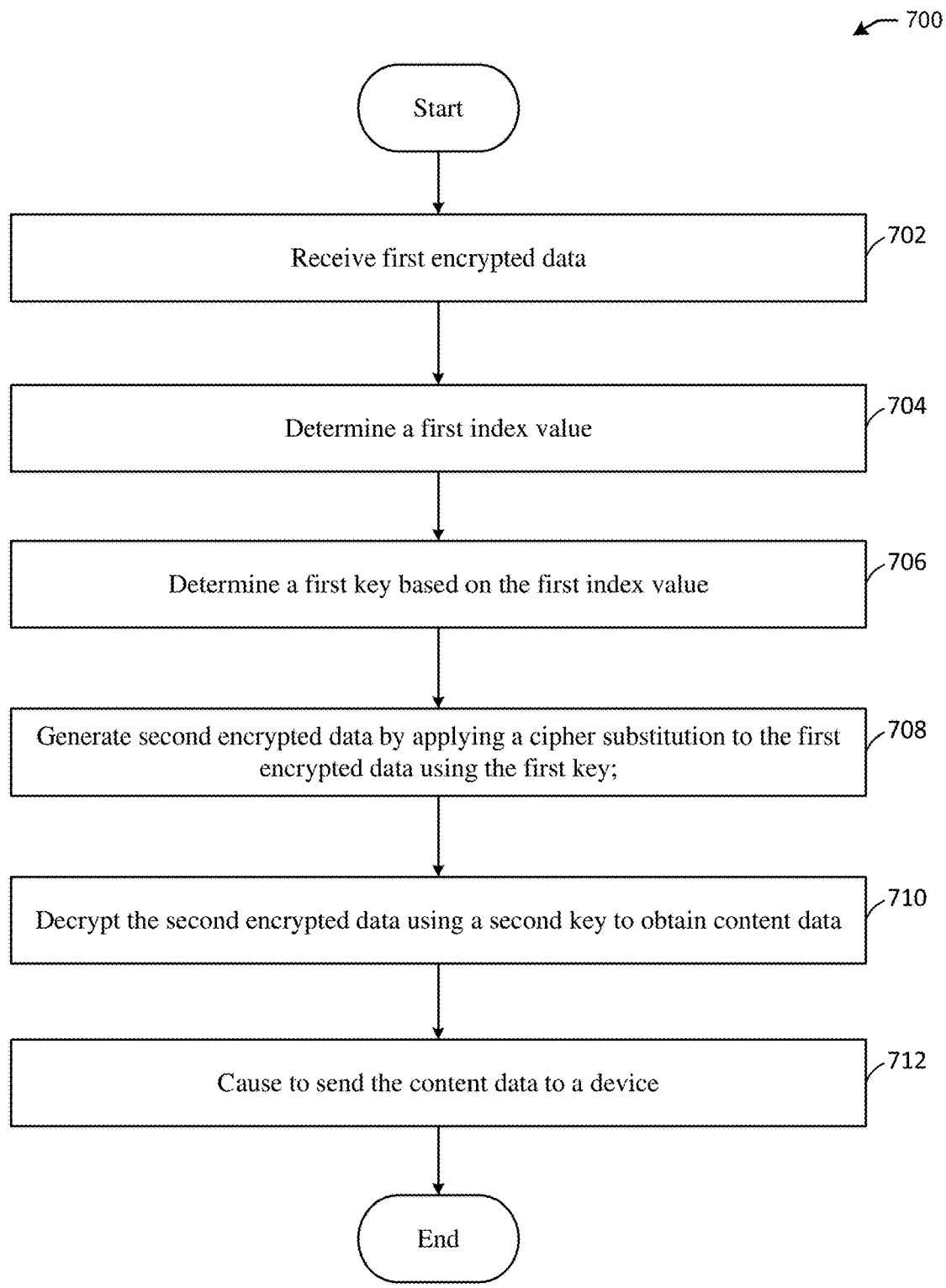
FIG. 7 is a process flow diagram of an illustrative method for decrypting data, in accordance with one or more example embodiments of the disclosure.

FIG. 7 is a process flow diagram of an illustrative method for decrypting data, in accordance with one or more example embodiments of the disclosure.

At block 702, a first device (e.g., a receiver, such as one of user device(s) 102 of FIG. 1) may receive first encrypted content data. The first encrypted content data may include data associated with the provision of one or more services, including one or more of video services, data services, voice services, home security services, billing services, application services, or web services. The first encrypted data may be encrypted according to transport layer security (TLS) or secure socket layer (SSL).

At block 704, the first device may determine a first index value. The first index value may be received prior to the first encrypted data. The first index value may be determined based on a dynamic value (e.g., a timestamp) available to the first device and the second device.

At block 706, the first device may determine a first key based on the first index value. The first key may be used to determine a cipher substitution algorithm. The first cipher substitution algorithm may be determined from a list and/or a table of one or more potential cipher substitution algorithms.

At block 708, the first device may generate second encrypted data by applying a cipher substitution to the first encrypted data using the first key. The first device may store a plurality of pseudorandom algorithms; and determine the cipher substitution from the plurality of pseudorandom algorithms based on the first index value. The cipher substitution may include one or more of: a simple cipher substitution, a dynamically changing cipher substitution, a polyalphabetic substitution, and/or a polygraphic substitution.

At block 710, the first device may decrypt the second encrypted data using a second key to obtain content data. The second key may be determined based on a third key that is paired with the second key. The second key may be a public key and the third key may be a private key paired with the public key.

At block 712, the first device may cause to send the content data to a device. The first device may cause the content data to be displayed on a display of the second device. The first device may receive third encrypted data; and decrypt the third encrypted data using the second key to obtain the first index value.

One or more operations of method 700 may have been described as being performed by one or more components of a system, such as system 100 of FIG. 1, or more specifically, by one or more program modules executing on such components. It should be appreciated, however, that any of the operations of method 700 described as being performed by a particular component or a particular program module executing thereon may be performed by another component or another program module executing thereon. In addition, it should be appreciated that processing performed in response to execution of computer-executable instructions provided as part of an application, program module, or the like may be described herein as being performed by the application or the program module itself, by a device on which the application, program module, or the like is executing, or by a system that includes such a device. While the operations of method 700 are described in the context of the illustrative system 100, it should be appreciated that the method may be implemented in connection with numerous other architectural and device level configurations.

In addition, it should be appreciated that the operations described and depicted in FIGS. 6 and 7 may be carried out or performed in any suitable order as desired in various embodiments of the disclosure. Additionally, in certain embodiments, at least a portion of the operations may be carried out in parallel. Furthermore, in certain embodiments, less, more, or different operations than those depicted in FIGS. 6 and 7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers), data storage (e.g., file management) routines, other common routines and services, etc.), or third-party software components (e.g., middleware, encryption or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may also invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A device comprising:
at least one computer processor; and
at least one non-transitory storage medium storing computer-executable code comprising:
receiving first content data;
encrypting the first content data using a first key to obtain first encrypted data;
generating second encrypted data by applying a cipher substitution to the first encrypted data using a second key;
generating third encrypted data by applying a second cipher substitution to the second encrypted data using a third key, wherein the second cipher substitution is different from the first cipher substitution; and
causing to send the third encrypted data to a second device.

2. The device of claim 1, wherein the first key is one of a private key or a public key of a key pair.

3. The device of claim 1, wherein the generating the second encrypted data comprises:
determining a first cipher algorithm from a plurality of cipher algorithms based on an index value; and
determining the second key based on the first cipher algorithm.

4. The device of claim 3, wherein the computer-executable code further comprises:
causing to send the index value to the second device.

5. The device of claim 1, wherein the cipher substitution includes one or more of:
a simple substitution, a polyalphabetic substitution, or a polygraphic substitution.

6. The device of claim 1, wherein the computer-executable code further comprises:
causing to send a value indicative of the second key to the second device.

7. A system, comprising:
at least one computer processor; and
at least one non-transitory storage medium storing computer-executable code comprising:
receiving first content data;
encrypting the first content data using a first key to obtain first encrypted data;
generating second encrypted data by applying a cipher substitution to the first encrypted data using a second key;
generating third encrypted data by applying a second cipher substitution to the second encrypted data using a third key, wherein the second cipher substitution is different from the first cipher substitution; and
causing to send the third encrypted data to a second device.

8. The system of claim 7, wherein the computer-executable code further comprises:
storing a plurality of pseudorandom algorithms; and
determining the cipher substitution from the plurality of pseudorandom algorithms based on a first index value.

9. The system of claim 7, wherein the computer-executable code further comprises receiving a first index value prior to the first encrypted data.

10. The system of claim 7, wherein the computer-executable code further comprises:
receiving third encrypted data; and
decrypting the third encrypted data using the second key to obtain a first index value.

11. The system of claim 7, wherein the computer-executable code further comprises:
causing the content data to be displayed on a display of the second device.

12. The system of claim 7, wherein the first encrypted data is encrypted according to transport layer security (TLS) or secure socket layer (SSL).

13. A method comprising:
receiving, by one or more processors, first content data;
encrypting, by the one or more processors, the first content data using a first key to obtain first encrypted data;
generating, by the one or more processors, second encrypted data by applying a cipher substitution to the first encrypted data using a second key; and
generating, by the one or more processors, third encrypted data by applying a second cipher substitution to the second encrypted data using a third key, wherein the second cipher substitution is different from the first cipher substitution; and causing to send, by the one or more processors, the third encrypted data to a second device.

14. The method of claim 13, wherein the first key is one of a private key or a public key of a key pair.

15. The method of claim 13, wherein the generating the second encrypted data comprises:
   determining, by the one or more processors, a first cipher algorithm from a plurality of cipher algorithms based on an index value; and
   determining, by the one or more processors, the second key based on the first cipher algorithm.

16. The method of claim 15, further comprising:
   causing to send, by the one or more processors, the index value to the second device.

17. The method of claim 13, wherein the cipher substitution includes one or more of: a simple substitution, a polyalphabetic substitution, or a polygraphic substitution.

18. The method of claim 13, further comprising causing to send, by the one or more processors, a value indicative of the second key to the second device.

\* \* \* \* \*